United States Patent [19]

Levin et al.

[11] 4,080,052
[45] Mar. 21, 1978

[54] OVERHEAD PROJECTION SYSTEM WITH LENS ASSEMBLY HAVING CONCENTRICALLY-ORIENTED CONDENSING LENSES

[75] Inventors: Robert E. Levin; Robert P. Bonazoli, both of South Hamilton, Mass.

[73] Assignee: GTE Sylvania Incorporated, Stamford, Conn.

[21] Appl. No.: 758,988

[22] Filed: Jan. 13, 1977

[51] Int. Cl.² .................. G03B 21/132; G03B 21/14
[52] U.S. Cl. ........................... 353/38; 353/55;
353/97; 353/98; 353/DIG. 3; 362/294
[58] Field of Search ............ 353/22, 30, 34, 37,
353/38, 55, 63, 82, 97, 98, 102, DIG. 3;
240/41.3, 106.1

[56] References Cited
U.S. PATENT DOCUMENTS

| 3,222,981 | 12/1965 | Lucas | 353/102 |
| 3,255,342 | 6/1966 | Seitz et al. | 353/55 |
| 3,547,530 | 12/1970 | Poole | 353/98 |
| 3,770,344 | 11/1973 | Fukushima | 353/38 |
| 3,818,218 | 6/1974 | Heenan et al. | 240/41.3 |
| 3,915,568 | 10/1975 | Yamada et al. | 353/38 |

FOREIGN PATENT DOCUMENTS 1,216,581  12/1970  United Kingdom ............ 353/98

Primary Examiner—Richard E. Aegerter
Assistant Examiner—Richard R. Stearns
Attorney, Agent, or Firm—Lawrence R. Fraley

[57] ABSTRACT

An overhead projection system which includes a planar lens assembly having two concentrically-oriented condensing lenses. The outer lens has a greater focal length than the inner lens to receive light reflected from the system's reflector while the inner condensing lens receives direct lighting from the system's light source. Accordingly, the inner lens images the light source at the projection lens of the system and the outer lens images the virtual image of the light source.

13 Claims, 10 Drawing Figures

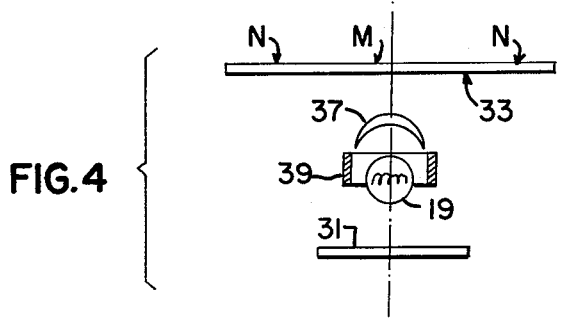
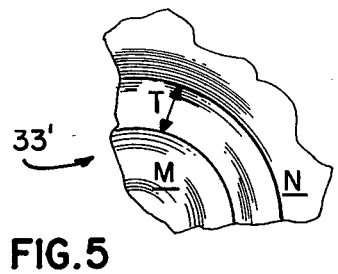
FIG. 4
FIG. 5
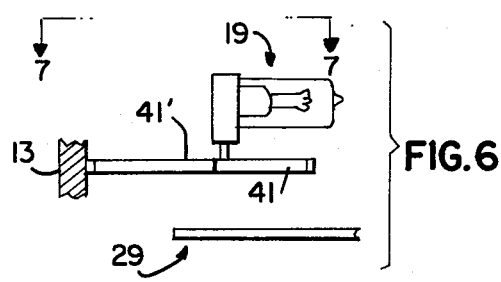
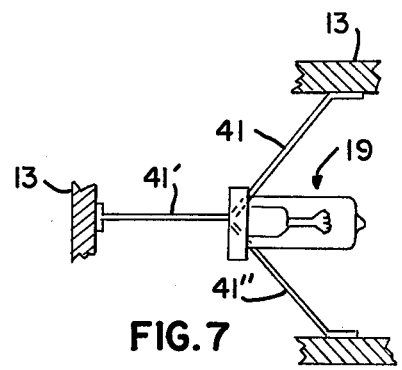
FIG. 6
FIG. 7
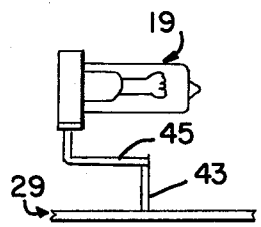
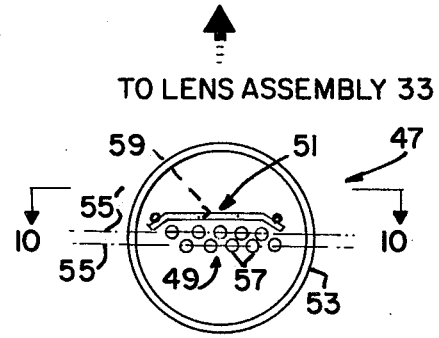
FIG. 8
TO LENS ASSEMBLY 33
FIG. 9
TO REFLECTOR 29
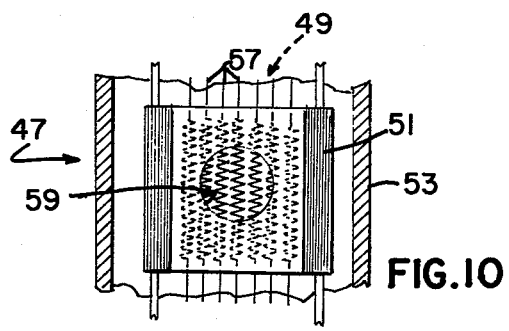
FIG. 10

OVERHEAD PROJECTION SYSTEM WITH LENS ASSEMBLY HAVING CONCENTRICALLY-ORIENTED CONDENSING LENSES

CROSS REFERENCE TO CO-PENDING APPLICATION

An application entitled "Incandescent Projection Lamp with Internal Reflector Having Light Defining Opening Therein" was filed Jan. 13, 1977 and is listed in the Patent and Trademark Office under Ser. No. 758,990. Ser. No. 758,990 is assigned to the same assignee as the present application and defines therein a projection lamp which is suitable for use in the instant invention.

BACKGROUND OF THE INVENTION

This invention relates to overhead projection systems.

Typically, overhead projectors comprise a housing or lamp box which includes therein the necessary light source and condensing lens system. A transparency is normally positioned atop the box and light is passed therethrough to a projection lens which projects the transparency's image on a screen. The most commonly used condensing lens is a Fresnel, which is basically a series of concentric simple lenses. Understandably, the function of the Fresnel is to concentrate the light from the light source at the entrance pupil of the projection lens. Alternative forms of projection may involve using a reflective condensing lens arrangement but the most preferred, for practical reasons including tolerances and uniformity, is the refractive condenser.

When projecting large transparencies, it was necessary in the past to utilize a "fast" condensing lens since projection design goals include minimizing the height of the projection system, including both the light box and the projector head located thereabove. The problem inherent in "fast" condensing lenses is the resulting dispersion which is induced by a relatively large edge ray deviation. Unless the projection lens pupil is increased to accommodate this dispersion, color can appear in areas of the projected image over some portions of the focusing range due to selective vignetting. Accordingly, the aforementioned problems lead to a desire for decreasing the speed of the condensing lens. Such a decrease could improve illumination uniformity over the projective field by reducing the inherent condensing lens losses which increase toward the field's edge.

One of the most recent attempts to decrease the condensing lens speed in an overhead projector is described in U.S. Pat. No. 3,770,344 (Fukushima). In this arrangement, four lamps are utilized under a composite Fresnel lens assembly in order that each lamp is conjugate to the projection lens. One particular problem of this system is that the human eye is very sensitive to contiguous luminance differences and unless all four lamps and respective lensing members are perfectly balanced in terms of luminous output, the four sections of the resulting image will appear as four distinctly different individual areas. Subsequent lamp replacement may also create an imbalance in the system of U.S. Pat. No. 3,770,344. Additionally, misalignment of a single lamp can produce asymmetry in the system with the result being a variation in the respective quadrant of the image.

It is believed therefore that an overhead projection system which overcomes the aforementioned difficulties of prior art systems would constitute a significant advancement in the art.

OBJECTS AND SUMMARY OF THE INVENTION

It is a primary object of the invention to enhance the overhead projection art.

It is another object of the invention to provide an overhead projection system which overcomes the above-defined problems inherent in most prior art systems.

It is a further object of the invention to provide the above features while still assuring a system which maintains a relatively low profile.

In accordance with one aspect of the invention, there is provided an overhead projection system which includes a housing, a light source and reflectance means within the housing, and a light directing means spacedly positioned from the housing for directing the light passing through a transparent article positioned within the housing to a display surface. The system further includes a planar lens assembly located within the housing between the transparent article and light source and comprising first and second condensing lenses. The second lens is concentrically positioned about the first and is adapted for receiving the light reflected by the system's reflectance means. The internal first condensing lens receives the direct lighting from the system's light source.

BRIEF DESCRIPTION OF THE DRAWINGS

FIGS. 3 and 4 illustrate additional embodiments of the invention;

FIG. 5 represents an alternate embodiment of a lens assembly for the invention;

FIGS. 6–8 illustrate various positioning arrangements for the light source of the invention; and FIGS. 9 and 10 show an alternate embodiment of a light source for the invention.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
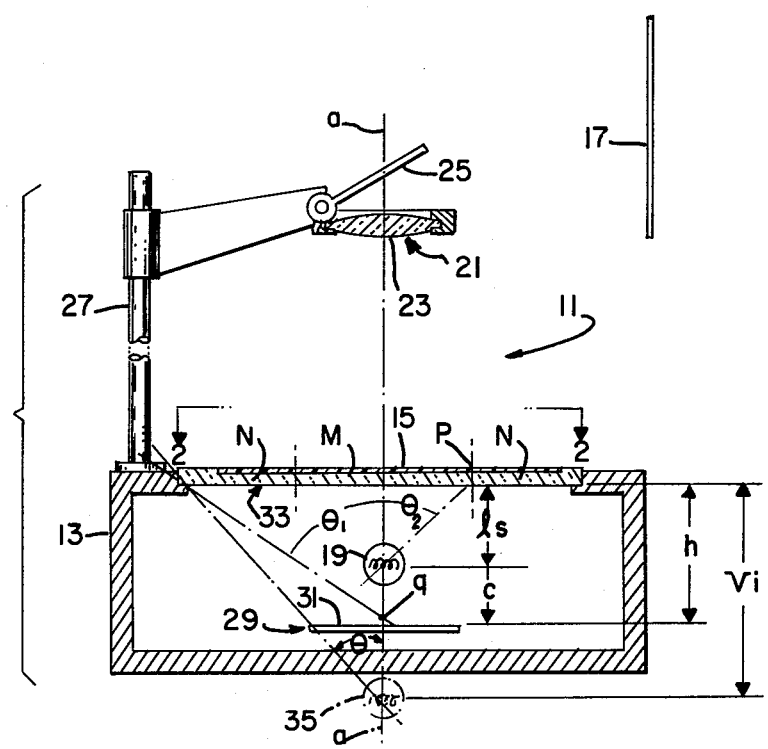
FIG. 1 is a side elevational view, partly in section, of an overhead projection system in accordance with one embodiment of the invention.

With particular reference to FIG. 1, there is shown an overhead projection system 11 in accordance with a preferred embodiment of the invention. System 11 comprises a housing 13 for receiving a transparent article 15 having an image therein to be projected on a display surface 17. Surface 17, e.g. a viewing screen, is located a specified distance from system 11 and thus does not constitute part of the instant invention. Within housing 13 is a singular light source 19 which shines light through article 15 to the system's light directing means 21. Means 21 is shown as being spacedly positioned from housing 13 and includes at least one lens 23 and an angular reflective surface 25 for directing the light received from housing 13 to display surface 17. Means 21 is mounted on an upstanding shaft member 27 and is preferably adjustable in a direction perpendicular to article 15. Typical adjustment devices suitable for use with directing means 21 include hand-operated gearing mechanisms, telescoping shafting, etc. Such devices are well known in the art and therefore are not shown.

Figure 3:
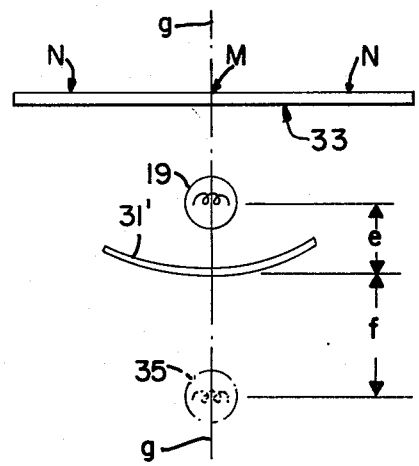

Positioned within housing 13 is a reflectance means 29, e.g. mirror 31, which is substantially adjacent light source 19 and adapted for reflecting a portion of the light from source 19 back toward transparent article 15. Mirror 31 may be planar as shown in FIG. 1 or curved in some predetermined shape, for example, hyperboloidal as shown in FIG. 3.

Figure 2:
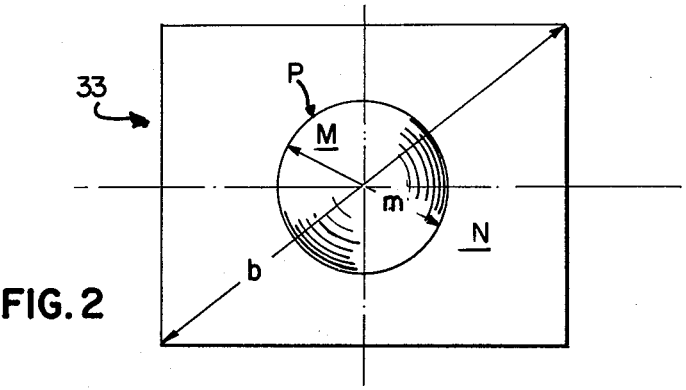
FIG. 2 is a plan view as taken along the line 2—2 in FIG. 1.

System 11 further comprises a substantially planar lens assembly 33 which is located within housing 13 between article 15 and light source 19. Article 15 is shown in FIG. 1 as being positioned atop lens assembly 33 with light 19 a spaced distance (dimension "1s") below. In referring to FIGS. 1 and 2, lens assembly 33 comprises first and second condensing lenses M and N, respectively. Lenses M and N are both preferably Fresnels, each thus containing a plurality of individual concentrically-oriented simple lens elements. As will be described, lens M receives direct lighting from source 19 while lens N is adapted for receiving the indirect, reflected light from means 29. Outer (second) lens N is concentrically-oriented about inner (first) lens M and preferably is positioned in the contiguous relationship shown in FIG. 2 with both members joined along a common boundary P.

Lens N has a greater focal length than lens M such that lens N has the virtual image 35 of light source 19 approximately conjugate to the entrance pupil of lens 23 while lens M has the light source 19 approximately conjugate to the entrance pupil. Additionally, lens M is preferably circular while N is rectangular although this is not meant to limit the broader aspects of the invention. That is, both lenses M and N could be rectangular hexagonal, octagonal, etc.

It is preferred that first lens M, light source 19, and lens 23 be positioned in system 11 in a coaxial relationship. That is, the centers of light 19 and lens M are preferably located on the optical axis ("a—a") of lens 23. Thus, for a given maximum diagonal dimension of the transparency stage (shown as dimension "b" in FIG. 2) and a given maximum height of the substage region (shown as dimension "h" in FIG. 1), the maximum angle of luminous flux from axis "a—a" is shown as angle $\theta$. If mirror 31 is removed from system 11 and only direct luminous flux from light 19 is used, light 19 would have to be positioned much lower than shown, thus substantially exceeding the present distance (dimension "1s") from lens assembly 33 provided the same dimension is used for "b". Assuming that source 19 would require positioning at point "q" with mirror 31 removed, source 19 would require an angle $\theta$, such that $\theta_1 > \theta$. In the present invention, $\theta_2$, the maximum flux angle from source 19 to the outer limits of lens M (or boundary P), is constrained in order that $\theta_2 > \theta$ at all times.

Examples of approximate dimensions as successfully used in the present invention are:
1. dimension "h" = 7.50 inches
2. dimension "1s" = 5.00 inches
3. dimension "vi" (lens to virtual image) = 10.00 inches
4. dimension "c" (light source to mirror) = 2.50 inches
5. dimension "b" = 14.14 inches
6. dimension "m" (diameter of lens M) = 5.00 inches.

Outer lens N is preferably square with each side approximately 10.0 inches long. When using the above dimensions, it is preferred to utilize a condensing lens M with a focal length of about 3.75 inches and a condensing lens N of about 6.00 inches.

It can be seen from the above dimensions that virtual image 35 is positioned the same distance from mirror 31 as source 19 but on the opposing side thereof.

The system as shown in FIG. 3 utilizes the aforementioned hyperboloidal mirror 31', light source 19, and planar lens assembly 33 having individual condensing lenses M and N therein. Hyperboloidal mirror 31' can serve to balance flux distribution across lens N thus enhancing screen illumination uniformity. Accordingly, use of a nonplanar mirror can increase the geometric efficiency of the total projection system over the system depicted in FIG. 1. It is therefore understood that the distance from light source 31' to mirror 31' (dimension "e") must be less than the distance from mirror 19 to virtual image 35 (dimension "f"). It can further be seen that lens M, light source 19, mirror 31' and virtual image 35 are all preferably located along a common axis "g-g" in the system of FIG. 3.

Another variation of the invention is shown in FIG. 4 and involves using a heat filter 37 above light 19 and below lens assembly 33 for substantially restricting heat from light 19 from reaching the lens assembly. This is a particularly desirable feature when utilizing a plastic or similarly heat-deformable material for assembly 33. Filter 37 can be a cold (dichroic) mirror or an absorption filter. Filter 37 may also incorporate optical power to vary the distribution of direct flux along inner lens M. Acting in this manner, filter 37 serves as a secondary lens. A masking means 39, preferably a cylindrical ring element, may be positioned substantially about light 19 to prohibit direct luminous flux therefrom from striking outer lens N. The above-mentioned components 37 and 39 may be supported within housing 13 on rod, wire, or blade members (not shown) provided that the projected cross sections of such members as seen from lens M are very small. Mirror 31 is also shown.

To lessen the opportunity for contrasting differences in illumination across boundary P in the lens assembly, it may be desirable to provide a transition. Accordingly, a lens assembly 33' is shown in FIG. 5 as including a transition region T which (FIG. 5). Region T is located between lenses M and which N and preferably contains a plurality of individual lens elements similar to the elements found in lenses M and N. Each of the transition elements similar to elements of lens M are positioned in an alternating relationship with the transition elements similar to elements in lens N. Alternative embodiments may include alternately positioning groupings of two N-similar and M-similar elements, alternately positioning two N-similar elements and three N-similar elements, etc. It can be understood that several positioning relationships are possible and further description is therefore not believed necessary.

FIGS. 6–8 depict some of the preferred positioning relationships for light source 19 within housing 13. The arrangements as shown substantially minimize undesirable shadows appearing on outer lens N. In FIGS. 6 and 7, light 19 is shown positioned on a three-arm support (41, 41', 41") assembly with each arm attached to an inner wall of housing 13. Accordingly, an open spacing is provided immediately below light 19 and above mirror 29. The embodiment of FIG. 8 shows a singular upstanding rod 43 and angular arm assembly 45 which positions light 19 such that rod 43 is approximately centered on mirror 29.

In FIGS. 9 and 10 is shown a preferred projection lamp 47 for use in the present invention. Lamp 47 includes a filament structure 49 and reflector 51 spacedly oriented from each other within the lamp's envelope 53. Structure 49 comprises a pair of substantially parallel planar arrays 55, 55' of individual coiled filaments 57 with the filaments 57 in array 55 offset from those in array 55' in the manner shown to present a substantially solid arrangement when viewed from the front or back of the lamp (as shown in FIG. 10). Reflector 51, often termed in the projection lamp art as an internal "proximity" reflector, is positioned in envelope 53 parallel to arrays 55 and 55', and includes an aperture 59 therein. Lamp 47 is oriented within projection system 11 such that reflector 51 is positioned between the system's lens assembly and filament structure. Accordingly, aperture 59 of internal reflector 51 defines the amount of direct lighting which is emitted by lamp 47 to lens M in addition to serving as a masking means for preventing direct light from the lamp from striking lens N. Aperture 59 is preferably circular when using a round internal lens M. It is understood, however, that this aperture may be of any configuration. Reflector 51 may also be another configuration, e.g. round. The remaining components of lamp 47, e.g. base, base pins, etc. may be selected from articles well known in the art and are thus not illustrated in FIGS. 9 and 10. The preferred materials for filaments 57 and reflector 51 are tungsten and tungsten plated molybdenum, respectively. An inert gas such as argon and a halogen, e.g. iodine or bromine, are also preferably incorporated within envelope 53 to facilitate operation of the lamp.

While there have been shown and described what are at present considered the preferred embodiments of the invention, it will be obvious to those skilled in the art that various changes and modifications may be made therein without departing from the scope of the invention as defined by the appended claims.

What is claimed is:

1. An overhead projection system comprising:
   a housing for receiving a transparent article having an image to be projected;
   a light source within said housing for shining light through said article;
   light directing means spacedly positioned from said housing and including a lens and reflective surface for directing the light passing through said article to a display surface;
   reflectance means positioned within said housing at a fixed distance from said light source for reflecting a portion of the light from said source toward said transparent article; and
   a substantially planar lens assembly positioned on said housing between said article and said light source, said lens assembly comprising a first condensing lens centrally located within said assembly for receiving the direct light from said light source, and a second condensing lens for receiving the reflected light from said reflectance means, said second condensing lens positioned about said first condensing lens in a concentric manner and having a focal length greater than the focal length of said first condensing lens, said focal lengths of said first and second condensing lenses being selected such that the real image of said light source and the real image of the virtual image of said light source, as formed by said first and second condensing lenses, respectively, are both approximately located at said lens of said light directing means.

2. The overhead projection system according to claim 1 wherein said second condensing lens is positioned about said first condensing lens in a contiguous relationship.

3. The projection system according to claim 1 wherein said first and second condensing lenses are Fresnel lenses.

4. The projection system according to claim 1 wherein said first condensing lens is substantially circular.

5. The projection system according to claim 4 wherein said second condensing lens is substantially rectangular.

6. The projection system according to claim 1 wherein said light source, said first condensing lens, and said lens within said light directing means are positioned in said system in a coaxial relationship.

7. The projection system according to claim 1 wherein said reflectance means comprises a planar mirror.

8. The projection system according to claim 1 wherein said reflectance means comprises a hyperboloidal mirror.

9. The projection system according to claim 1 including a secondary lens positioned between said light source and said planar lens assembly for varying the distribution of direct light from said light source on said first condensing lens.

10. The projection system according to claim 1 further including a heat filter positioned between said light source and said planar lens assembly for substantially restricting the heat emitted by said light source from reaching said planar lens assembly.

11. The projection system according to claim 1 further including a masking means positioned about said light source for prohibiting the direct light from said source from striking said second condensing lens.

12. The projection system according to claim 1 wherein said planar lens assembly includes a transition region, said transition region located between said first and second condensing lenses and comprising a plurality of individual lens elements similar to the lens elements of said first and second condensing lenses, said transition region elements similar to the first condensing lens elements positioned within said transition region in a substantially alternating pattern with respect to said transition region elements similar to the second condensing lens elements.

13. The projection system according to claim 1 wherein said light source comprises a lamp including therein a filament structure and reflector member, said reflector member spacedly positioned from said filament structure and having an aperture therein, said lamp oriented within said projection system such that said reflector member is located between said filament structure and said planar lens assembly whereby said aperture will define the amount of light striking said first condensing lens.

* * * * *